United States Patent [19]

Singh et al.

[11] Patent Number: 4,879,410
[45] Date of Patent: Nov. 7, 1989

[54] PREPARATION OF PRIMARY ARALKYL URETHANES AND UREAS AND ISOCYANATES DERIVED THEREFROM

[75] Inventors: Balwant Singh, Stamford; Laurence W. Chang, New Haven; William A. Henderson, Jr., Stamford, all of Conn.

[73] Assignee: American Cyanamid Company, Stamford, Conn.

[21] Appl. No.: 926,070

[22] Filed: Nov. 3, 1986

[51] Int. Cl.$^4$ ................. C07C 119/00; C07C 125/06; C07C 127/01

[52] U.S. Cl. .................... 560/344; 560/345; 560/24; 560/25; 560/26; 560/28; 560/33; 564/32; 564/56; 564/255; 548/537; 546/192; 546/205; 540/356; 540/531

[58] Field of Search ........... 560/344, 345, 28, 24, 560/25, 26, 33; 564/56, 32, 255; 548/537; 540/356, 531; 546/192, 205

[56] References Cited

U.S. PATENT DOCUMENTS

| | | | |
|---|---|---|---|
| 3,290,350 | 12/1966 | Hoover | 260/453 |
| 3,919,279 | 11/1975 | Rosenthal et al. | 560/345 |
| 3,992,430 | 11/1976 | Bacskai | 560/345 |
| 4,039,568 | 8/1977 | Sakai et al. | 560/345 |
| 4,130,577 | 12/1978 | Hamashima et al. | 260/239 A |
| 4,290,970 | 9/1981 | Merger et al. | 560/345 |
| 4,361,518 | 11/1982 | Singh et al. | 260/453 P |
| 4,379,767 | 4/1983 | Alexanian et al. | 260/453 P |
| 4,439,616 | 3/1964 | Singh et al. | 560/25 |
| 4,459,236 | 7/1984 | Merger et al. | 560/345 |
| 4,570,012 | 2/1986 | Singh et al. | 560/25 |

*Primary Examiner*—Alan Siegel
*Attorney, Agent, or Firm*—Steven H. Flynn

[57] ABSTRACT

A process is disclosed for the preparation of aralkyl mono- and diurethanes or ureas by carbamylmethylation, or acid-catalyzed addition at a temperature of 40° C. to about 100° C. of formaldehyde and esters of carbamic acid to aromatic hydrocarbons. Aralkyl carbamates and ureas formed by this process can be cracked directly to produce aralkyl diisocyanates, or hydrogenated and then cracked to produce aliphatic diisocyanates, or reacted directly with polyols to produce polyurethanes by functioning as blocked isocyanates.

23 Claims, No Drawings

PREPARATION OF PRIMARY ARALKYL URETHANES AND UREAS AND ISOCYANATES DERIVED THEREFROM

FIELD OF THE INVENTION

The present invention relates to new processes for the preparation of novel mono- and diurethane and urea compounds formed by carbamylmethylation of aromatic hydrocarbons. The aralkyl carbamates or diurethane compounds so formed are useful as intermediates in the preparation of aralkyl isocyanate compounds by thermal cracking and for the preparation of cycloaliphatic methylene isocyanate compounds by metal-catalyzed hydrogenation and subsequent cracking.

The urethanes produced herein may be used to prepare polyurethanes directly by reaction with polyols. The urethanes obtained by this process may also be used directly as blocked isocyanates. Both the aralkyl and the cycloaliphatic isocyanates are useful in the manufacture of light stable polyurethanes, RIM applications, coatings and adhesives.

BACKGROUND OF THE INVENTION

Various methods have been employed to produce aralkyl isocyanate compounds. It is known for example, that organic diamine or monoamine derivatives can be reacted with phosgene to produce corresponding mono- and diisocyanates.

Drawbacks with phosgenation reactions include the toxicity of phosgene, and corrosion problems associated with the by-product hydrochloric acid. Furthermore, the organic amines are difficult to prepare requiring elevated pressures while producing low yields of final product.

The difficulties with direct phosgenation have led to the development of non-phosgenation routes.

In particular, tertiary aralkyl isocyanates have been prepared by a variety of different reactions, such as by reaction of corresponding olefins with isocyanic acid as described in U.S. Pat. No. 3,290,350, and by reaction of the corresponding halides with an alkali metal isocyanate as disclosed in U.S. Pat. No. 4,130,577. The olefin addition route suffers the disadvantages that the yields are poor and that large amounts of olefin and isocyanic acid are lost through self polymerization. On the other hand while the reaction of the halide with the alkali metal isocyanate can provide high yields, the reaction times are long, and the halogen is completely lost as the alkali metal halide, recoverable only at great expense. The reaction of the halide with isocyanic acid is a substantial improvement in terms of yield and reaction time over the prior processes but it consumes hydrogen halide in the manufacture of the aromatic halides from the corresponding olefins.

Other investigations have reported the preparation of aralkyl isocyanates by reaction of the corresponding halide with isocyanic acid as in U.S. Pat. No. 4,361,518, by addition of the corresponding olefin with a carbamoyl halide to form the benzyl halide followed by reaction with an excess of isocyanic acid as disclosed in U.S. Pat. No. 4,379,767, and by thermal cracking of urethanes formed by reaction with corresponding olefins and carbamic acid esters as in U.S. Pat. No. 4,439,616.

Aralkyl urethanes, which can be used as intermediates in the synthesis of isocyanate derivatives, have likewise been produced by a number of routes.

Merely by way of illustration, Singh et al., U.S. Pat. No. 4,570,012 report the production of tertiary aralkyl urethanes, such as tetramethyl xylylene diurethanes, by addition of corresponding tertiary aromatic diols and carbamic acids at moderate temperatures and in the presence of acid catalyst. This method of production is disadvantageous in that it requires expensive aromatic diol compounds which are not widely available commercially.

It has been surprisingly discovered now that primary aralkyl urethanes and ureas and corresponding isocyanate compounds, as well as aliphatic isocyanate compounds, can be synthesized by a new and novel route that utilizes low cost, readily available commodity chemicals such as toluene, xylene, urea, methanol and formaldehyde and yet, still avoids the conventional toxic phosgenation technology.

SUMMARY OF THE INVENTION

According to the present invention, there is provided a process for production of a urethane or urea selected from those of the formulae:

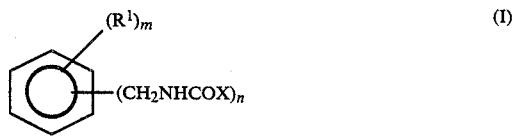

or

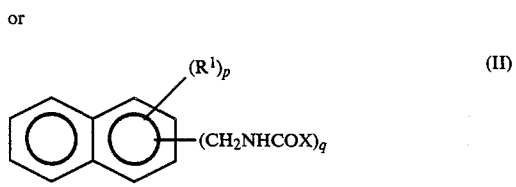

or a mixture of (I) and (II) or an oligomer thereof wherein X is selected from OR, $-NR^2{}_2$,

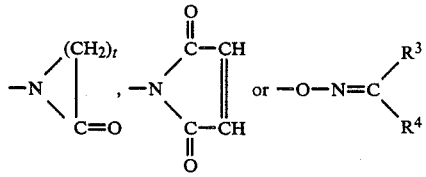

R is alkyl or hyroxy alkyl of from about 1 to about 6 carbon atoms, aryl of from about 6 to about 10 carbon atoms or aralkyl of from about 7 to about 10 carbon atoms, $R^1$ is hydrogen or alkyl of from about 1 to about 30 carbon atoms, $R^2$ is alkyl of from about 1 to about 6 carbon atoms, $R^3$ is as defined for $R^1$, $R^4$ is as defined for $R^2$, and when taken together, $R^3$ and $R^4$, are $-CH_2(CH_2)_3CH_2-$ or $-CH_2(CH_2)_2CH_2-$, n is an integer of 1 to 2 and m is 6-n, q is an integer of 1 or 2 and p is 8-q, and t is an integer of from 2 to 6, said process comprising reacting (a) an aromatic hydrocarbon of the formula

or

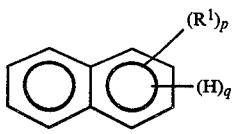
(IV)

wherein R¹, m, n, p and q are as above defined, with
(b) a carbamate of the formula

H₂N—COX wherein X is as above defined;
(c) formaldehyde or a source of formaldehyde, or a condensation product of (b) and (c); and
(d) an effective catalytic amount of an acid at a temperature of from about 30° C. to about 150° C. until formation of said urethane or urea compound (I), (II) or a mixture or oligomer thereof is substantially complete.

Also provided is a process, as defined above, further comprising the step of heating the urethane or urea product (I), (II) or mixture thereof in an inert organic solvent at a temperature in the range of from about 125° C. to about 300° C., optionally in the presence of an effective amount of a catalyst until formation of an isocyanate compound of the formula:

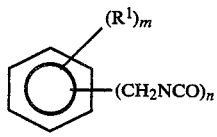
(V)

or

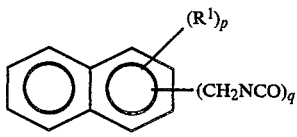
(VI)

or a mixture of (V) and (VI) or oligomer thereof wherein R¹, m, n, p and q are as first defined above is substantially complete.

Further provided according to this invention is a process, as first defined above, further comprising the step of catalytically hydrogenating said urethane or urea product (I), (II) or mixture thereof to produce the corresponding hexahydro or decahydro urethane or urea and thereafter heating said hydrogenated urethane at a temperature in the range of from about 125° C. to about 300° C. until formation of a totally aliphatic isocyanate compound of the formulae:

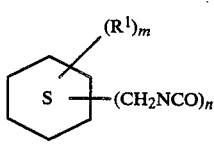
(VII)

or

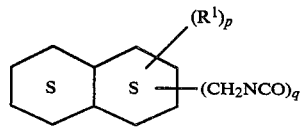
(VIII)

or a mixture of (VII) and (VIII) or oligomer thereof wherein R, m, n, p and q are as first defined above with the proviso that each ring carbon atom bears at least one hydrogen atom, is substantially complete.

Also contemplated by the present invention is a urethane or urea selected from those of the formulae:

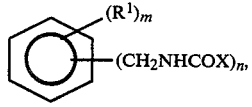
(I)

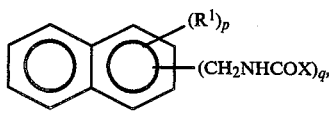
(II)

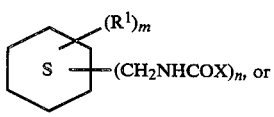
(VII)

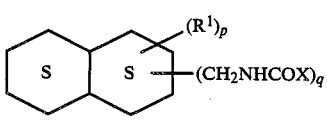
(VIII)

or a mixture of (I) and (II) or of (VII) and (VIII) or an oligomer thereof wherein X is selected from —OR, —NR₂², or $$-N\begin{matrix}(CH_2)_t\\ \diagdown\\ C=O\end{matrix},\ -N\begin{matrix}O\\ \|\\ C-CH\\ \|\ \|\\ C-CH\\ \|\\ O\end{matrix}\ or\ -O-N=C\begin{matrix}R^3\\ \diagdown\\ R^4\end{matrix}$$

R is alkyl or hydroxy alkyl of from about 1 to about 6 carbon atoms, aryl of from about 6 to about 10 carbon atoms or aralkyl of from about 7 to about 10 carbon atoms, R¹ is hydrogen or alkyl of from about 1 to about 30 carbon atoms, R² is alkyl of from about 1 to about 6 carbon atoms, R³ is as defined for R¹, R⁴ is as defined for R², and when taken together, R³ and R⁴, are —CH₂(CH₂)₃CH₂— or —CH₂(CH₂)₂CH₂—, n is an integer of 1 to 2 and m is 6-n, q is an integer of 1 or 2 and p is 8-q, and t is an integer of from 2 to 6.

Special mention is made of compounds of formula (I) which are $$\underset{H_3C}{\overset{CH_3}{\bigcirc}}-CH_2NHCOX\ or$$
(Ia)

-continued

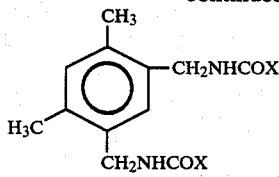 (Ib)

or a mixture of (Ia) and (Ib) or an oligomer thereof wherein X is CH₃, —CH₂CH₃, —CH₂CH₂CH₃ or —CH(CH₃)₂.

Special mention is also made of compounds of formula (VII) which are

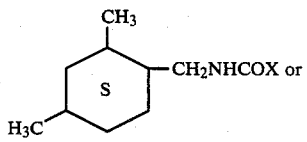 (VIIa)

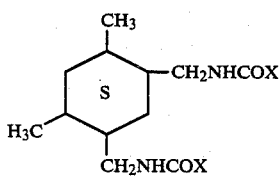 (VIIb)

or a mixture of (VIIa) and (VIIb) or an oligomer thereof wherein X is CH₃, —CH₂CH₃, —CH₂CH₂CH₃ or —CH(CH₃)₂.

Also contemplated are curable compositions comprising active hydrogen compounds and the novel polyurethane and/or polyisocyanate compounds of this invention.

Other objects and advantages of the present invention will become apparent from the following detailed description of the invention taken in conjunction with the illustrative working examples.

DETAILED DESCRIPTION OF THE INVENTION

In accordance with the process of the present invention, primary aralkyl carbamates or ureas are prepared by reacting lower alkyl, aryl, aralkyl, diamine, N-substituted heterocyclic carbamates or ureas with a suitable aromatic hydrocarbon and formaldehyde in the presence of acid catalyst at a temperature of from about 20° C. to about 150° C., preferably 40° C. to 100° C., to form mono- and diurethane compounds.

The aromatic hydrocarbons useful in the preparation of primary aralkyl carbamates or ureas in accordance with the present invention include mono- and bicyclic aryl compounds such as benzene and naphthalene compounds. These aryl compounds broadly can be substituted with one or more lower alkyl groups preferably having from 1 to 30 carbon atoms, especially preferably 1 to 3 carbon atoms, for example, toluene, o-, m- and p-xylene, mesitylene, 1,2,4,5-tetramethylbenzene, isopropyltoluene, alpha-methyl naphthalene, and the like. Preferably, the aryl compounds will be toluene or any of the isomers of xylene. Especially preferred is the meta isomer of xylene.

The carbamate compounds (b) used in the process are represented by the general formula:

H₂N—COX wherein X is as defined above.

When X is OR, R can be alkyl of from 1 to 6 carbon atoms, such methyl, ethyl, propyl, isopropyl, hexyl and the like, R can be aryl or substituted aryl of from 6 to 10 carbon atoms such as phenyl, tolyl, xylyl, trimethylphenyl, tetramethylphenyl, ethylphenyl, and the like, and R can be aralkyl or substituted aralkyl of from about 7 to about 10 carbon atoms, such as benzyl, alpha-methyl benzyl, p-methylbenzyl, beta-phenylethyl, and the like. When X is NR²₂, each R² can be the same or different and will comprise alkyl of from 1 to about 6 carbon atoms, such as methyl, ethyl, isopropyl, n-hexyl and the like. When X is

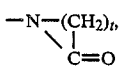

t can be from 1 to 6, preferably 3 or 4, e.g., derived from pyrrolidone or caprolactam. The other derivatives can be made from corresponding maleimides, aldoximes and ketoximes. All of the carbamates, imides and oximes are either available commercially, or they can be made by well known procedures. Methyl carbamate ad ethyl carbamate are preferred.

The formaldehyde or formaldehyde precursor (c) compound useful in carrying out this invention includes gaseous formaldehyde and formalin, which comprises a solution of about 37% by weight of formaldehyde in water, usually with 10–15% methanol added to prevent polymerization.

Alternatively, formaldehyde may be employed herein in the form known as trioxymethylene and as paraform.

Complexes of formaldehyde with alcohols, e.g., methanol, known as formcels can also be used.

In those embodiments wherein reactants (b) and (c) may be "pre-reacted" to form (C') there can be used hydroxyalkylcarbamate such as N-methylolmethyl carbamate:

HOCH₂NHCOOCH₃, or a methylene bisalkyl urethane, such as methylene-bis-methyl urethane:

or a cyclodehydration product of a hydroxyalkyl carbamate, such as a triazine derivative of the formula:

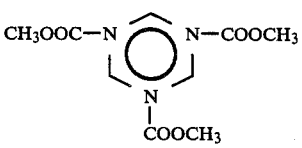

The preparation of such combinations of (b) and (c) will be fully exemplified hereinafter.

Acid catalysts suitable for use in the carbamylmethylation process of this invention include sulfuric acid, phosphoric acid, hydrochloric acid, solid sulfonic acid resins, acetic acid, hydrogen fluoride, hydrocarbon sulfonic acids, hydrocarbon sulfate esters as well as Lewis acids, such as boron trifluoride etherate. Preferred catalysts are phosphoric acid and sulfuric acid. In general, the acid catalyst is present in excess and serves as a solvent.

The reaction can take place in the absence of solvent or in the presence of solvents, such as methanol, ethanol, acetic acid, methylene dichloride, ethylene dichloride, chlorobenzene, and so forth.

The product distribution depends upon relative mole ratios of the reactants, temperature, time, mode of addition and stirring rate.

Generally, while the proportion of carbamate compound (b) to aromatic hydrocarbon (a) can be stoichiometric, preferably the carbamate is in substantial excess and functions as solvent and catalyst moderator as well as reactant. It is preferred in accordance with this invention to use from 15% to 400% stoichiometric excess of carbamate, preferably about 200% excess carbamate.

The proportion of formaldehyde or formaldehyde precursor (c) likewise can vary widely, but this generally will be in the range of from about 0.2 to about 2 moles for each mole of hydrocarbon (a).

The amount of catalyst required to promote the addition reaction of aromatic hydrocarbon and carbamic acid ester can be varied widely, but at least about 0.75 moles/per mole of hydrocarbon is needed. Where substantial excess of carbamate (b) is utilized the amount of catalyst, based on the aromatic hydrocarbon (a) is typically 1.0 to 10 moles per mole of aromatic hydrocarbon. Preferably the amount of catalyst should be in excess of the amount of carbamate.

Preferably the carbamate is heated mildly, if necessary, to maintain it molten, e.g., 30° C. to 150° C., with from 40° C. to 100° C. being preferred. The catalyst is dissolved in the molten carbamate, aromatic hydrocarbon is added and formaldehyde is then slowly added with efficient stirring. The reaction proceeds best at 70° C. and is generally over in about 1 to 4 hours. When the reaction is complete the mixture is treated to remove or neutralize the catalyst. Unreacted carbamate (b) is then separated by distillation in partial vacuum, by adding a large excess of water and filtering to separate insoluble urethane products from water-soluble carbamate ester, or in any other convenient manner.

The reaction can be conducted using a significant excess of aromatic hydrocarbon, for example, xylene, over formaldehyde, in which case the monocarbamate is formed with high selectivity. Monocarbamate is isolated in a known manner, e.g., by flashing off the hydrocarbon, and can be converted in a second stage to diurethane, for example, by further reaction with formaldehyde and methyl carbamate.

If the reaction is carried out in a single stage using stoichiometric quantities of the reactants, moderate conversions to mono and dicarbamates are achieved.

Primary aralkyl urethane esters and ureas form the corresponding isocyanate by thermal cracking while splitting off the alkanol or corresponding nitrogen compound. In many cases the alcohol can usefully be recycled by reaction with urea or isocyanic acid (HNCO) to form the starting carbamate ester.

In cracking the urethane esters and the ureas to form the corresponding isocyanates the acidic catalyst must be removed or neutralized for example, with calcium oxide, sodium carbonate, sodium hydroxide and the like. This is followed by cracking of the urethane ester or urea either solvent-free or in high boiling solvents, such as hexadecane, diphenyl ether, diisopropyl naphthalene, silicone oil and the like. Cracking takes place at temperatures on the order of 125° C. to 350° C. splitting off the alkanol or corresponding nitrogen compounds to yield the corresponding isocyanate.

This invention has particular application in the production of primary aralkyl polyisocyanates from aromatic hydrocarbons, formaldehyde, and carbamic acid esters or ureas by addition of the reactants to form the corresponding N-aralkyl carbamates followed by thermal cracking of the N-aralkyl carbamates or ureas to the corresponding aromatic diisocyanates.

Alternatively, the aralkyl carbamates and ureas may be hydrogenated to produce saturated analogs which can then be cracked to produce totally aliphatic isocyanates.

In the hydrogenation process, hydrogen and a catalyst are used to produce the corresponding hexahydro or decahydro urethane or ureas by standard procedures. For example, a solution of the starting material in an alcohol solvent, e.g., methanol or ethanol, is reacted at a suitable temperature, e.g., in the range of 30° C. to 170° C. and at an elevated pressure, e.g., 40 to 4,000 pounds per square inch of hydrogen with a catalyst, such as rhodium, ruthenium, rhenium, nickel, mixtures thereof, compounds thereof, and the like, until the aromatic rings are saturated. The products are isolated in conventional ways, e.g., by filtering off the catalyst and evaporating the solvent.

Illustratively, the preparation of 3,4-dimethylxylylene diisocyanate (DMXDI) and cyclohexyl-3,4-dimethylxylylene diisocyanate and oligomers from starting materials hereinbefore described is outlined as follows:

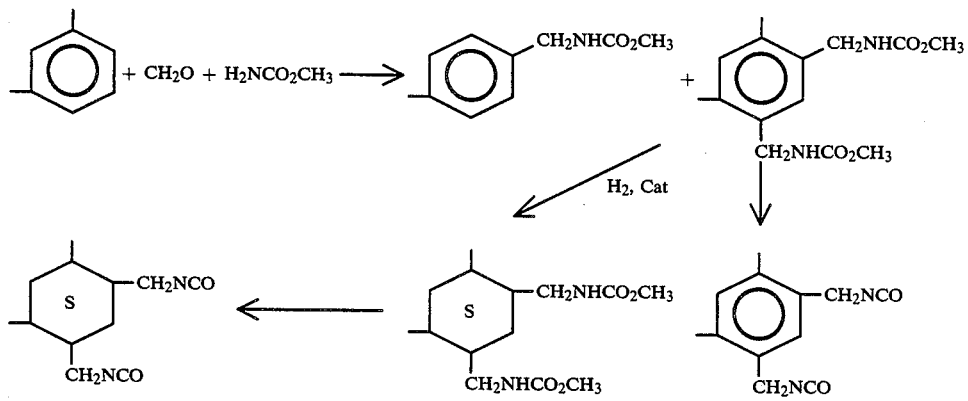

More particularly, the diurethanes and ureas can be cracked to the corresponding diisocyanates by refluxing in a high boiling solvent while passing a stream of inert gas through the solution to remove the alcohol formed. Alternatively, they can be cracked by refluxing under reduced pressure in the presence of a basic catalyst, or by passing the hot vapor of the diurethane through a hot tube. Unreacted or half cracked material may be recycled through the cracking step.

DESCRIPTION OF THE PREFERRED EMBODIMENTS

The following examples illustrate the novel processes and novel compounds of the present invention. They are not to be construed to limit the claims in any manner whatsoever.

In accordance with known techniques, coating compositions can be made by mixing polyols with effective amounts of 0.5 to 5 —NCO/—OH of polyisocyanates, optionally in a hydrocarbon solvent, preferably with a catalyst, e.g., 1% of a tin compound and curing, e.g., at 60°-150° C. for 1 minute to 1 hour. Hard, solvent resistent films are thus obtained. Alternatively, the polyurethanes and polyureas can be substituted for the polyisocyanates; these will "unblock" under the conditions of the curing reaction and also produce cured compositions.

In the following Examples and Tables, the following abbreviations are used:
MEC—carbamic acid methyl ester, methyl urethane, methyl carbamate
DMXDU—tetramethylxylylene diurethane
DMXDI—dimethylxylylene diisocyanate
MXU—dimethylxylylene monourethane
MEDU—methylene diurethane
XDU—xylylene diurethane
$H_6$—DMXDI—hexahydro dimethylxylylene diisocyanate
$H_6$—XDU—hexahydro xylylene diurethane
$H_6$—DMXDU—hexahydro dimethylxylylene diurethane

EXAMPLES 1-5

These examples illustrate a method for the carbamylmethylation of m-xylene using excess m-xylene. Aqueous formalin solution (0.2 moles of formaldehyde) was added slowly and with good stirring to well-stirred mixtures of 1.0 mole m-xylene, 0.25 moles of methyl carbamate and 0.75 moles of phosphoric acid. After the reaction was over, a small amount of water was added to the mixture and the organic layer was separated. Results were obtained by gas phase chromatography for these reactions as outlined in Table 1:

TABLE 1

| Carbamylmethylation of m-Xylene Using Excess m-Xylene | | | | | |
|---|---|---|---|---|---|
| Example | 1 | 2 | 3 | 4 | 5 |
| Time (hours) | | | | | |
| Addition | 2.5 | 1.0 | 1.0 | 1.0 | 0.5 |
| Reaction | 5.5 | 4.5 | 3.0 | 1.5 | 1.0 |
| Temperature (°C.) | 70 | 70 | 100 | 100 | 100 |
| Yields (% based on formaldehyde) | | | | | |
| MXU | 59 | 58 | 53 | 57 | 57 |
| DMXDU | 23 | 26 | 22 | 25 | 31 |
| Total (MXU + DMXDU) | 82 | 84 | 75 | 82 | 88 |

The above data indicate that excess m-xylene provides for the selective formation of the monourethane (MXU) product.

EXAMPLE 6

This example illustrates the carbamylmethylation of m-xylene using formalin. At 65° C. and with good stirring, 0.1 moles of m-xylene and 0.2 moles of formaldehyde in the form of a formalin solution (37% in water) were added simultaneously for a period of more than 2 hours using syringe pumps to 0.2 moles of methyl carbamate in 0.25 moles of phophoric acid. The mixture was stirred at 65° C. for an additional 18 hours and then analyzed by gas chromatography. The yields based on m-xylene of aromatic compounds were 8, 16 and 11% of m-xylene, MXU and DMXDU, respectively.

EXAMPLE 7

This example also illustrates the carbamylmethylation of m-xylene using formalin. The procedure of Example 7 was followed except that the reaction was run at 60° C. and not 65° C. and using 0.25 moles of sulfuric acid in place of the phosphoric acid. The addition was carried out over 1 hour, and after an additional 3 hours, the yields were 5, 14 and 20% of m-xylene, MXU and DMXDU, respectively.

EXAMPLE 8

This example illustrates the carbamylmethylation of MXU to meta-xylene. Distillation of the product from several of the runs from Examples 1-5 gave 96% pure MXU, b.p. 114°-120° C./0.5 mm, the yield based on formaldehyde being about 56% and the major impurity in the distillate being DMXDU. When 0.1 mole of formalin was added slowly with good stirring to a mixture of 0.1 mole MXU (prepared by distillation of material obtained in earlier examples), 0.15 mole of methyl carbamate and 0.75 mole of phosphoric acid for more than 1 hour at 10° C. and the reaction mixture held at that temperature for 8 hours, the yields of MXU and DMXDU as shown by gas chromatography were 18% and 48%, respectively for a total recovery of 66%.

EXAMPLES 9 and 10

This example illustrates the use of (C'), a preselective reacted (b) and (c). A mixture of 1 mole of para-formaldehyde, 1 mole of methyl carbamate and 5 g of p-toluenesulfonic acid in 500 ml of toluene was refluxed for 18 hours. The toluene was stripped and replaced with 1000 ml of methylene chloride. The solution was neutralized with sodium carbonate solution, washed with water and dried to give gummy crystals (83%) of the compound 1,3,5-triscarbomethoxyhexahydro-1,3,5-triazine. Recrystallization from ethanol gave white crystals, m.p. 116°-119° C.

For Example 9, 0.1 mole of m-xylene was added with good stirring to a mixture of 0.07 mole of the triazine, 0.25 mole of sulfuric acid and 40 ml of acetic acid at 40° C. and stirred at that temperature for 20 hours. Gas chromatography gave yields based on the triazine of 10% MXU and 41% DMXDU.

For Example 10, the reaction of Example 9 was run again but using 40 ml of methanol instead of acetic acid and at the reflux temperature of methanol. After 6 hours, yields were 15% MXU and 30% DMXDU.

EXAMPLE 11

This example also illustrates the use of m-xylene, paraformaldehyde and methyl carbamate catalyzed by concentrated sulfuric acid. At 55° C., a reaction was run with a reactant mole ratio of m-xylene: $(CH_2O)_n$:MEC:$H_2SO_4$ of 1:2:2:2. The reaction formed MXU and DMXDU in the yield of 3% and 27% respectively.

EXAMPLES 12–16

The procedure of Example 11 was followed with the exception that the quantity of sulfuric acid catalyst was varied as were the times and temperatures for reaction, all as shown in Table 2:

TABLE 2
Reaction of m-Xylene, Paraformaldehyde and Methyl Carbamate Catalyzed by Concentrated Sulfuric Acid

| Example | 12 | 13 | 14 | 15 | 16 |
|---|---|---|---|---|---|
| Composition (moles by weight) | | | | | |
| Sulfuric Acid/Xylene | 2 | 2 | 2 | 1 | 0.5 |
| Time (hours) | 3 | 20 | 2 | 22 | 18 |
| Temperature (°C.) | 90 | 25 | 55 | 55 | 55 |
| Yields (percentage)[a] | | | | | |
| MXU | 3 | * | 4 | 18 | * |
| DMXDU | 11 | * | 22 | 8 | * |

[a]Yield determined by GLC
*Trace.

EXAMPLE 17

This example illustrates a larger scale synthesis of DMXDU from paraformaldehyde, methyl carbamate and m-xylene. To a solution containing 111 ml (2.08 moles) of concentrated sulfuric acid and 440 ml of glacial acetic acid was added 60g (2.0 moles) of paraformaldehyde; the mixture was stirred in a 56° C. oil bath for 30 minutes and then 150 g (2.0 moles) of methyl carbamate was slowly added. The reaction mixture turned a clear homogeneous liquid after the first portion of methyl carbamate was added. The mixture was stirred for 50 minutes after the addition of methyl carbamate had been completed. 106 g (1 mole) of m-xylene was then added dropwise. After being heated at 55° C. for 15 hours with stirring, the reaction mixture was distilled at reduced pressure to recover acetic acid. A total of 200 ml of acetic acid was thus distilled. The distillation residue was cooled and added slowly to 2 l of 4N cold aqueous sodium hydroxide solution. The resulting sticky precipitate was filtered and washed with water until the washings were neutral. After being dried at 60° C. under vacuum, the solid was recrystallized from acetone. 73.1 g of m-DMXDU was obtained (yield 25%). The melting point of the product was 171°–173° C. and the product displayed the following spectroscopic properties:

IR ($cm^{-1}$): 3330, (N—H); 3140, (C=C—H); 2940, (C—C—H); 1690, ( C=O); 1530, (N—H)
NMR ($CDCl_3$, δ): 2.3, (2 $CH_3$); 3.7 (2 $OCH_3$); 4.2–4.4 (2 $CH_2$); 4.7–5.0 (2 NH); 6.9–7.1, (2 aromatic H).

EXAMPLES 18–20

This Example illustrates the reaction of m-xylene and MEDU catalyzed by concentrated $H_2SO_4$. MEDU, a reaction product of 1 mole of $CH_2O$ and 2 moles of MEDU, was used in these examples. The reacted mole ratio of m-xylene:$H_2SO_4$ was 1:2. Data and product yield obtained by GLC are set forth in Table 3.

TABLE 3
Reaction of m-Xylene and MEDU Catalyzed by Concentrated Sulfuric Acid[a]

| Example | 18[a] | 19[a] | 20[b] |
|---|---|---|---|
| Compositions (moles by weight) | | | |
| MEDU/m-Xylene | 2.5 | 2.5 | 3.0 |
| Time (hours) | 24 | 24 | 25 |
| Temperature (°C.) | 55 | 85 | 80 |
| Product Yield (percentage) | | | |
| MXU | 17 | 3 | 18 |
| DMXDU | 44 | 35 | 41 |

[a]acetic acid (solvent)
[b]methylene chloride (solvent)

EXAMPLE 21

This example also illustrates the reaction of m-ylene and MEDU. 20.25 g (125 m mole) of MEDU was added to a solution of 6 ml (109 m moles) of concentrated sulfuric acid and 20 ml of glacial acetic acid to obtain a clear homogeneous solution. To this clear solution was added 5.3 g (50 m moles) of m-xylene followed by stirring in a 55° C. oil bath for 24 hours. The reaction mixture was analyzed with GLC and GL/Mass. The formation of m-DMXDU was confirmed by the comparison of GLC retention time with the authentic sample. The formation of MXU was confirmed by GLC/mass spectrometry. GLC (internal standard method) analysis indicated that MXU and DMXDU were formed in the yield of 17% and 44% respectively.

EXAMPLES 22–24

Reactions were carried out at 70° C. or 100° C. following the general procedures above, but using reactant mole ratios of m-xylene, paraformaldehyde, methyl carbamate, and phosphoric acid of 1:2:2.25:7.5. Phosphoric acid was used both as a catalyst and as a solvent. Data and product yields determined by GLC are given in Table 4.

TABLE 4
Synthesis of DMXDU from m-Xylene, Methyl Carbamate, and Paraformaldehyde Catalyzed by Phosphoric Acid

| Example | 22 | 23 | 24 |
|---|---|---|---|
| Catalyst (moles by weight) | | | |
| $H_3PO_4$/m-Xylene | 7.5 | 7.5 | 4 |
| Time (hours) | 18 | 1.5 | 6 |
| Temperature (°C.) | 70 | 100 | 100 |
| Yield (percentage) | | | |
| MXU | 3 | 7 | 17 |
| DMXDU | 43 | 32 | 24 |

Results indicate that at 70° C. the reaction is complete after 18 hours with yields of MXU and DMXDU of 3% and 43%, respectively. Conducting the reaction at higher temperature, for example, 100° C., shortened the reaction time significantly but the yields of MXU and DMXMU decreased to 32% and 7%, respectively.

EXAMPLE 25

37.5g (0.5 m) of methyl carbamate was added to a flask containing 173 g (1.5 m) of 85% w/w phosphoric acid and stirred at 70° C. for a few minutes. 6 g (0.2 m) of paraformaldehyde was added to the reaction mixture to obtain a homogeneous liquid. 21 g (0.2 m) of m-xylene was then added in a period of 2 hours using a syringe pump. During this 2 hours period, another 6 g (0.2 m) of paraformaldehye was added in ten portions to the reaction flask. After the addition of m-xylene and paraformaldehyde was completed, the reaction mixture was stirred at 70° C. for 18 hours. A considerable amount of solid precipitated out of the reaction mixture and heating was discontinued. 50 ml of water and 100 ml of methylene chloride were added to the reaction flask. After being stirred at room temperature for one hour, the reaction mixture was filtered. The solids collected were washed with water and methylene chloride. The washings were combined with the filtrate; and the combined mixture was separated into two parts - the organic ($CH_2Cl_2$) layer and the aqueous (phosphoric acid) layer. The solid (collected by filtration) and the organic layer were analyzed by GLC (internal standard). The results indicated that the yields of MXU and DMXDU were 3% and 43%, respectively.

EXAMPLE 26-31

These Examples illustrate the hydrogenation of urethane compounds prepared in accordance with this invention. For Example 26, the hydrogenation of XDU was carried out in ethanol solvent in the presence of a rhodium on carbon hydrogenation catalyst, Rh/C, at 30° C. and a pressure of 60 psi for 12 hours. For Examples 27–31, the catalyst and other conditions were varied. The conditions used and the analyses by GLC area percent provided product yield data as set forth in Table 6:

TABLE 6
Hydrogenation of Urethane Compounds

| Example | Starting Compound | Conditions | Product (yield)[a,b] |
|---|---|---|---|
| 26 | XDU | Rh/C, 30° C., 60 psi, 12 h, $C_2H_5OH$ | $H_6$—XDU (99%)[d] |
| 27 | XDU | $Ru_2O/C$, 100° C., 1000 psi, 5 h, $C_2H_5OH$ | $H_6$—XDU (93%) |
| 28 | XDU | R—Ni, 150° C., 3600 psi, 3 h, $C_2H_5OH$ | $H_6$—XDU (95%) |
| 29 | DMXDU | Rh/C, 50° C., 60 psi 8 h, $CH_3OH$ | $H_6$—DMXDU (98%)[e] |
| 30 | DMXDU | $Ru_2O/C$, 120° C., 1500 psi, 6 h, $Ch_3OH$ | $H_6$—DMXDU (95%) |
| 31 | DMXDU | R—Ni(active), 160° C., 3700 psi, 4 h, $CH_3OH$ | $H_6$—DMXDU (58%)[c] DMXDU (16%)[c] |

[a] The structure of product was confirmed by NMR.
[b] Isolated yield unless otherwise noted.
[c] GLC area percent.
[d] $H_6$—XDU: mp 100–103° C. NMR ($CDCl_3$, δ): 1–2 ($2CH_3$, $4CH_2$, 2CH); 2.7–3.2 (2-N—$CH_2$); 3.8–4.3 ($2OCH_2$); 4.7–5.2(2NH).
[e] $H_6$—DMXDU: mp 74–82° C. NMR ($CDCl_3$), 8C: 0.8–1 (2 $CH_3$); 1–2.1 (2 $CH_2$, 4 CH); 2.8–3.3 (2N—$CH_2$); 3.6 (2 $OCH_3$); 4.8–5.2 (2NH).

EXAMPLE 27

The procedure of Example 26 was followed with these exceptions: the catalyst $Ru_2O/C$ was used in place of Rh/C; a temperature of 100° C. was used instead of 30° C; a pressure of psi instead of 60 psi was applied; and the time for hydrogenation was reduced to 5 hours instead of 12 hours. Analysis by GLC indicated a product yield of $H_6XDU$ of 93%. The product melting point was 100°–103° C. and NMR characteristics were as follows:

($CDCl_3$, δ): 1–2 ($2CH_3$, $4CH_2$, 2CH); 2.7–3.2 (2-N—$CH_2$); 3.8–4.3 ($2OCH_2$); 4.7–5.2(2NH).

EXAMPLE 28

The procedure of Example 26 was followed with these exceptions: Raney Nickel was used as a catalyst in place of Rh/C; the temperature was 150° C. instead of 30° C.; a pressure of 3600 psi was applied instead of 60 psi and the hydrogenation time was reduced to 3 hours instead of 12 hours.

Analysis by GLC area percent indicated a product yield of $H_6XDU$ of 95%. Melting point of the product was 100°–103° C. and NMR characteristics were as follows:

($CDCl_3$, δ): 1–2 ($2CH_3$, $4CH_2$, 2CH); ,2.7–3.2 (2-N—$CH_2$); 3.8–4.3 ($2OCH_2$); 4.7–5.2(2NH).

EXAMPLE 29

The procedure of Example 26 was followed with the exception that the aralkyl urethane DMXDU was hydrogenated instead of XDU.

Analysis by GLC area percent indicated a product yield of $H_6DMXDU$ of 98%. Melting point of the product was 74°–82° C. and NMR characteristics were as follows:

($CHCl_3$, δ): 0.8–1 (2 $CH_3$); 1–2.1 ($2CH_2$, 4CH); 2.8–3.3 ($2NCH_2$) 3.6 (2 $OCH_3$); 4.8–5.2 (2NH).

EXAMPLE 30

The procedure of Example 27 was followed with these exceptions: DMXDU was hydrogenated instead of XDU; a temperature of 120° C. was used instead of 100° C.; a pressure of 1500 psi was applied instead of 1000 psi; and the reaction was allowed to run for 6 hours and not 5 hours.

Analysis by GLC area percent indicated a product yield of $H_6$—DMXDU of 95%. Melting point of the product was 74°–82° C. and NMR characteristics were as follows:

($CHCl_3$, δ): 0.8–1 (2 $CH_3$); 1–2.1 ($2CH_2$, 4CH); 2.8–3.3 ($2NCH_2$) 3.6 (2 $OCH_3$); 4.8–5.2 (2NH).

EXAMPLE 31

The procedure of Example 28 was followed with these exceptions: DMXDU was hydrogenated in place of XDU; Raney Nickel (active) was employed instead of R/Ni; the temperature of 160° C. was used instead of 150° C; the pressure of 3700 psi was applied, instead of 3600 psi and the reaction ran for 4 hours and not 3 hours.

Analysis by GLC indicated product yields for $H_6DMXDU$ of 58% and for DMXDU of 16%. Melting point of the product $H_6DMXDU$ was 74°–82° C. and NMR characteristics were as follows:

($CHCl_3$, δ): 0.8–1 (2 $CH_3$); 1–2.1 ($2CH_2$, 4CH); 2.8–3.3 ($2NCH_2$) 3.6 (2 $OCH_3$); 4.8–5.2 (2NH).

In Examples 37–40 the cracking of urethane compounds was carried out in the inert organic solvent, hexadecane at 260° C. for 4 hours. A steady stream of nitrogen passed through the reaction mixture during the cracking to carry away alcohol formed in the reaction.

EXAMPLES 32–33

The ethyl ester of $H_6XDU$ was cracked to yield respective percentages of di- and monoisocyanate of 93% and 7%, respectively.

EXAMPLES 34–35

The methyl ester of $H_6DMXDU$ was cracked. GLC area percent gave a yield of di- and monoisocyanate percentages of 40% and 33%, respectively.

EXAMPLE 36

A curable composition is made comprising a hydroxy functional acrylic acid and the $H_6DMXDI$ of Example 31. A copolymer of hydroxyethyl acrylate with other acrylics (G-CURE® 867) and H6DMXDI at 50% non-volatiles in a hydrocarbon solvent, the —NCO/—OH ratio being 1.1/1.0 was treated with 1.0% (TRS) of a tin catalyst, UL-28, and spread on a 1200 S aluminum substrate and cured for 20 minutes at 60°, 80° and 100° C. Hard, solvent-resistant films in accordance with this invention should be obtained.

EXAMPLE 37

If the procedure of Example 36 is repeated, substituting H6DMXDU for H6DMXDI, the diurethane will unblock and also should cure to a hard, solvent-resistant film in accordance with this invention.

In all of the foregoing examples, non-volatile oligomeric materials having at least one isocyanate or urethane group were also obtained.

The above-mentioned patents, publications and test methods are incorporated herein by reference.

Many variations will suggest themselves to those skilled in this art, in light of the above detailed description. For example, instead of using m-xylene or toluene as the aromatic hydrocarbon, para-xylene, ortho xylene, mesitylene, 1,2,4,5-tetramethylbenzene or naphthalene substituted by lower alkyl can be used. Instead of methyl carbamate, any of the lower alkyl esters, phenyl esters, N-dialkyl esters or N-heterocyclic esters can be used. Instead of phosphoric acid or sulfuric acid as catalysts for the carbamylmethylation reaction, other acids such as hydrogen chloride, hydrogen fluoride or sulfate esters can be used.

All such obvious variations are within the full intended scope of the appended claims.

We claim:

1. A process for production of a urethane or urea selected from the formulae:

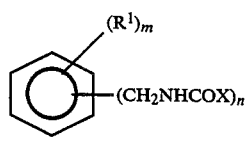

or

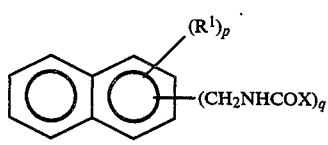

or a mixture of (I) and (II) wherein X is selected from —OR, —NR$^2_2$,

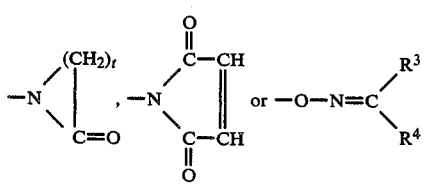

R is alkyl or hydroxy alkyl of from about 1 to about 6 carbon atoms, aryl of from about 6 to about 10 carbon atoms or aralkyl of from about 7 to about 10 carbon atoms, R$^1$ is hydrogen or alkyl of from about 1 to about 30 carbon atoms, R$^2$ is alkyl of from about 1 to 6 carbon atoms, R$^3$ is as defined for R$^1$, R$^4$ is as defined for R$^2$, and when taken together, R$^3$ and R$^4$, are —CH$_2$(CH$_2$)$_3$CH$_2$— or —CH$_2$(CH$_2$)$_2$CH$_2$—, n is an integer of 1 to 2 and m is 6-n, q is an integer of 1 or 2 and p is 8-q, and t is an integer of from 2 to 6, said process comprising reacting (a) an aromatic hydrocarbon of the formula

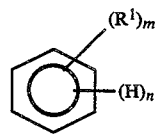

or

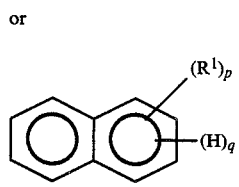

wherein R$^1$, m, n, p and q are as above defined, with (b) a carbamate of the formula

wherein X is as above defined; trioxymethylene, paraform, formcels and condensation products of (b) and the forementioned; and (d) an effective catalytic amount of an acid catalyst at a temperature of from about 30° C. to about 150° C. until formation of said urethane or urea compound (I), (II), or a mixture thereof is substantially complete.

2. A process as defined in claim 1 wherein there is produced a urethane selected from those of the formulae:

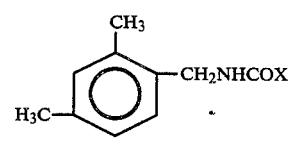

or

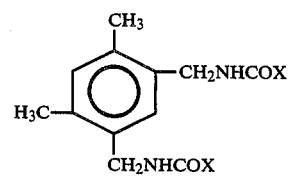

wherein X is OCH$_3$ or OCH$_2$CH$_3$.

3. A process as defined in claim 1 in which from about 0.15 to about 4 moles of carbamate (b) alone or combined with (c) are reacted per mole of aromatic hydrocarbon (a).

4. A process as defined in claim 1 wherein said aromatic hydrocarbon (a) is selected from benzene, toluene, meta-xylene, para-xylene, ortho-xylene, mesitylene, 1,2,4,5-tetramethylbenzene, naphthalene substituted by lower alkyl or a mixture of any of the foregoing.

5. A process as defined in claim 1 wherein said aromatic hydrocarbon (a) is meta-xylene.

6. A process as defined in claim 1 wherein said aromatic hydrocarbon (a) is para-xylene.

7. A process as defined in claim 1 wherein in said carbamate (b) R is methyl or ethyl.

8. A process as defined in claim 7 wherein in said carbamate (b) R is methyl.

9. A process as defined in claim 1 wherein (c) is formalin or paraformaldehyde.

10. A process as defined in claim 1 wherein said acid catalyst (d) is selected from sulfuric acid, phosphoric acid, hydrogen chloride, a sulfonic acid resin, hydrogen fluoride, alkyl sulfonic acid, a sulfate ester or Lewis acid.

11. A process as defined in claim 1 wherein said acid catalyst (d) is phosphoric acid.

12. A process as defined in claim 1 wherein said acid catalyst (d) is sulfuric acid.

13. A process as defined in claim 1 carried out in a solvent comprising acetic acid.

14. A process as defined in claim 1 further comprising the step of pre-reacting a mixture of (b) with (c) followed by reacting (a) with the pre-reacted product in the presence of an effective amount of acid catalyst (d).

15. A process as defined in claim 17 in which the pre-reaction mixture comprises a methylolalkyl carbamate, a methylene-bis-alkyl carbamate, or a cyclodehydrated hydroxy-methyl alkyl carbamate.

16. A process as defined in claim 1 wherein (a), (b), (c), and (d) are reacted by dissolving (b) in said acid catalyst (d), adding (a), and slowly adding (c) with efficient stirring, until formation of said urethane compounds (I), (II) or a mixture thereof is substantially complete.

17. A process as defined in claim 1 wherein (a), (b), (c), and (d) are reacted using an excess of (a) with respect to (c), until formation of a monourethane compound (I) is substantially complete, isolating said monourethane compound (I) by removing unreacted (a), and thereafter reacting urethane compound (I) with (b) and (c) until formation of said diurethane compound (II) is substantially complete.

18. A process as defined in claim 1 further comprising removing catalyst (d) from the mixture of products (I) and (II) and heating the urethane or urea product (I), (II) or mixture thereof in an inert organic solvent at a temperature in the range of from about 125° C. to about 350° C. until formation of an isocyanate compound of the formulae:

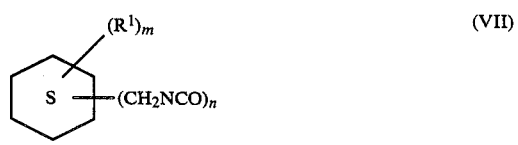

(V)

or

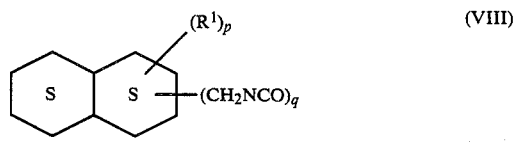

(VI)

or a mixture of (V) and (VI) wherein $R^1$, m, n, p and q are as defined in claim 1 is substantially complete.

19. A process as defined in claim 18 wherein said inert organic solvent comprises hexadecane.

20. A process as defined in claim 18 wherein there is produced a diisocyanate of the formula

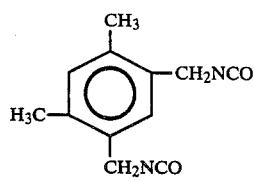

21. A process as defined in claim 1 further comprising catalytically hydrogenating said urethane or urea product (I), (II) or mixture thereof by contacting (I), (II), or mixture thereof with a hydrogenation catalyst to produce the corresponding hexahydro or decahydro urethane and heating said hydrogenated urethane at a temperature in the range of from about 200° C. to about 300° C. until formation of a totally aliphatic isocyanate compound of the formulae:

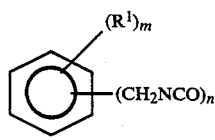

(VII)

or

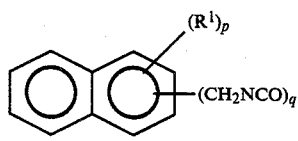

(VIII)

or a mixture of (VII) and (VIII) wherein, R, m, n, p and q are as defined in claim 1, with the proviso that each ring carbon atom bears at least one hydrogen atom, is substantially complete.

22. A process as defined in claim 27 wherein the hydrogenation catalyst comprises rhodium, ruthenium, nickel, compounds thereof or a mixture of any of the foregoing.

23. A process as defined in claim 1 further comprising neutralizing catalyst (c) and heating the urethane or urea product (I), (II) or mixture thereof in an inert solvent at a temperature of in the range of from about 125° C. to about 350° C. until formation of an isocyanate compound of the formulae:

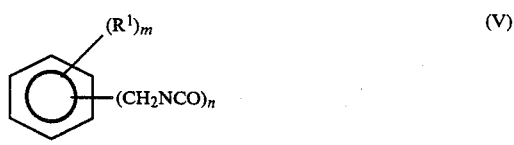

(V)

or

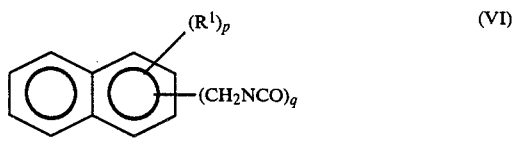

(VI)

or a mixture of (V) and (VI) wherein $R^1$, m, n, p and q are as defined as claim 1 is substantially complete.

* * * * *